(12) United States Patent
Erjawetz et al.

(10) Patent No.: US 9,186,974 B2
(45) Date of Patent: Nov. 17, 2015

(54) DRIVE TRAIN

(75) Inventors: Konstantin Erjawetz, Voitsberg (AT); Wolfgang Kriegler, Graz (AT); Gerald Teuschl, Rülzheim (DE)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 259 days.

(21) Appl. No.: 13/807,333

(22) PCT Filed: Jun. 24, 2011

(86) PCT No.: PCT/EP2011/003121
§ 371 (c)(1),
(2), (4) Date: Jun. 14, 2013

(87) PCT Pub. No.: WO2012/000630
PCT Pub. Date: Jan. 5, 2012

(65) Prior Publication Data
US 2015/0060166 A1 Mar. 5, 2015

Related U.S. Application Data

(60) Provisional application No. 61/358,981, filed on Jun. 28, 2010.

(51) Int. Cl.
*B60K 6/383* (2007.10)
*B60K 6/48* (2007.10)
(Continued)

(52) U.S. Cl.
CPC . *B60K 6/383* (2013.01); *B60K 6/48* (2013.01); *B60W 10/02* (2013.01); *F16D 43/04* (2013.01);
(Continued)

(58) Field of Classification Search
CPC .................. B60W 2510/0266; B60K 6/383
USPC ............... 180/65.21, 65.245, 65.25, 65.265
See application file for complete search history.

(56) References Cited

U.S. PATENT DOCUMENTS

| 4,499,965 A | * | 2/1985 | Oetting et al. ............... 180/165 |
| 5,285,111 A | * | 2/1994 | Sherman ...................... 290/4 C |

(Continued)

FOREIGN PATENT DOCUMENTS

| CN | 1250511 A | 4/2000 |
| CN | 101022967 A | 8/2007 |

(Continued)

OTHER PUBLICATIONS

English Translation: description of DE 10 2007 061895, Espacenet, translated: Jul. 3, 2015.*

*Primary Examiner* — Brodie Follman
*Assistant Examiner* — Brian Cassidy
(74) *Attorney, Agent, or Firm* — Jordan IP Law, LLC; Todd A. Vaughn

(57) ABSTRACT

A drive train of a motor vehicle with an internal combustion engine, an electric motor and a coupling device. The coupling device includes a first coupling unit allocated to the internal combustion engine and a second coupling unit allocated to the electric motor. By way of the coupling device, the internal combustion engine and/or the electric motor can be connected for drive purposes with a common drive shaft to drive at least one wheel of the motor vehicle. The first coupling unit and the second coupling unit are separate components which can be coupled together automatically by a clutch depending on a difference between a rotation speed of the internal combustion engine and a rotation speed of the electric motor.

19 Claims, 6 Drawing Sheets

(51) Int. Cl.
  *B60W 10/02* (2006.01)
  *F16D 43/04* (2006.01)
  *B60W 20/00* (2006.01)

(52) U.S. Cl.
  CPC ...... *B60L 2240/421* (2013.01); *B60L 2240/441* (2013.01); *B60W 20/00* (2013.01); *B60W 2510/081* (2013.01); *Y02T 10/6221* (2013.01); *Y10S 903/946* (2013.01)

(56) References Cited

U.S. PATENT DOCUMENTS 6,299,541 B1 * 10/2001 Bertin et al. .............. 464/68.92
6,311,495 B1 * 11/2001 Shimizu et al. ................. 60/718
2010/0117375 A1 * 5/2010 Kwok ........................... 290/1 R
2010/0167869 A1 * 7/2010 Falkenstein et al. .............. 477/3
2010/0193270 A1 * 8/2010 Deshaies et al. ......... 180/65.265

FOREIGN PATENT DOCUMENTS

| DE | 100 45 533 A1 | 4/2002 |
| DE | 10 2007 043737 A1 | 3/2009 |
| DE | 10 2007 061895 A1 | 6/2009 |
| EP | 0 724 978 A1 | 8/1996 |
| EP | 2 050 608 A1 | 4/2009 |

* cited by examiner

DRIVE TRAIN

CROSS-REFERENCE TO RELATED APPLICATIONS

The present application is a National Stage Application of PCT International Application No. PCT/EP2011/003121 (filed on Jun. 24, 2011), under 35 U.S.C. §371, which claims priority to U.S. Provisional Patent Application No. 61/358,981 (filed on Jun. 28, 2010), which are each hereby incorporated by reference in their complete respective entireties.

FIELD OF THE INVENTION

The present invention concerns a drive train of a motor vehicle with an internal combustion engine and with an electric motor.

BACKGROUND OF THE INVENTION

In principle, widely varying types of hybrid architectures of a drive train of a motor vehicle are known which combine an internal combustion engine and an electric motor to ensure an efficient drive of the motor vehicle. In general, three different levels of hybridization are distinguished which differ in relation to the contribution of drive torque supplied by the electric motor.

For so-called micro-hybrid vehicles, usually an electric motor is provided for an automatic start-stop system and a braking energy recovery system to charge a comparatively small starter battery. The electric motor is not used to drive the vehicle.

In so-called mild hybrids, the electric motor in contrast supports the internal combustion engine to increase the power. Also with a suitable design of the drive train, the energy occurring during a braking process can be partly recovered in a generator mode of the electric motor.

In contrast to the hybridization stages described above, full hybrid vehicles are able to be driven completely by the electric motor. In such vehicles for example it can be provided that the internal combustion engine merely drives an electric generator which supplies the electric motor with the electrical energy and/or charges a battery. Therefore smaller-dimensioned internal combustion engines can be used than in motor vehicles with comparable performance levels. In addition the internal combustion engine can be operated in an efficient operating state as power peaks can normally be covered by extracting energy from the battery.

Hybrid architectures are known in which an electric motor and an internal combustion engine are connected together or with the drive train via one or two clutches. A disadvantage, in particular in architectures with two clutches, is the complex design of the clutches and the functional and geometric integration of the electric motor in the drive train. Also control of the system is comparatively complex.

SUMMARY OF THE INVENTION

It is therefore, an object of the present invention to provide a drive train which fulfils the functionality of a mild hybrid and, for at least part of the time, also allows purely electric drive of the vehicle. At the same time the components necessary for said functionalities can easily be integrated in a conventional drive train of a motor vehicle with only an internal combustion engine.

This object is achieved by a drive train of a motor vehicle with an internal combustion engine, with an electric motor and with a coupling device which comprises a first coupling unit allocated to the internal combustion engine and a second coupling unit allocated to the electric motor and by means of which the internal combustion engine and/or the electric motor can be connected for drive purposes with a common drive shaft to drive at least one wheel of the motor vehicle, wherein the first coupling unit and the second coupling unit are separate components which can be coupled together automatically by a clutch depending on a difference between a rotation speed of the internal combustion engine and a rotation speed of the electric motor.

In other words, according to the invention it is provided that the internal combustion engine and the electric motor can be connected with the drive shaft via separate coupling units, so that different configurations of the drive train can be provided in different drive situations. In principle it is possible that both the internal combustion engine and the electric motor can be connected with the drive shaft selectively and independently of each other. However it has proved advantageous if the coupling device is formed such that the internal combustion engine can only be coupled with the drive shaft when the electric motor is connected with the drive shaft via the second coupling unit.

With the automatically acting clutch, the drive train according to the invention can be operated reliably. It ensures that the coupling units are coupled without external intervention when certain operating parameters are present. According to the invention the coupling of the coupling units takes place depending on a difference between a rotation speed of the internal combustion engine and a rotation speed of the electric motor. With this design, the internal combustion engine and the electric motor are coupled together when suitable conditions are present, for example in order then to be able to contribute jointly to the drive of the vehicle. It is also conceivable that with the coupling units in coupled state, both the working power of the internal combustion engine drives the vehicle and the generator operation of the electric motor generates electrical energy which is used to operate ancillary assemblies and/or to charge an energy accumulator.

The electric motor can easily be integrated in a conventional drive train since only the coupling device and the electric motor need be inserted. The former can for example be integrated in a starter element and/or in a torsional vibration damper or at least arranged in the physical vicinity of said components.

Further embodiments of the invention are given in the description, the claims and the enclosed drawings.

In accordance with one embodiment, the clutch is formed such that the first coupling unit is coupled for drive purposes with the second coupling unit when the rotation speed of the internal combustion engine is substantially equal to or greater than the rotation speed of the electric motor. In other words a coupling between the first and second coupling unit is created only when the internal combustion engine has at least the same rotation speed as the electric motor. This is advantageous, for example, in situations in which the motor vehicle is initially operated purely electrically, such as in a starting situation, and the internal combustion engine is only connected later. As long as the internal combustion engine is not yet running with the necessary rotation speed, it is not connected with the second coupling unit and hence with the drive shaft. Only when the rotation speeds are equal is there an at least partial transfer of power from the electric motor to the internal combustion engine. The electric motor can however remain connected with the drive shaft in order to be able to provide additional drive torque if required and hence relieve the load on the internal combustion engine.

The first coupling unit, the second coupling unit and/or the clutch can be arranged coaxially. Alternatively or additionally it can be provided that the internal combustion engine and/or the electric motor are arranged coaxial to the first coupling unit and the second coupling unit.

A compact construction of the drive train results when the rotation axis of the electric motor is arranged offset to the rotation axis of the internal combustion engine.

In accordance with one embodiment, the clutch is an overrun device. The overrun device allows selective coupling and decoupling of the two coupling units as a function of the difference in rotation speed between the electric motor and the internal combustion engine. In other words a coupling between the coupling units takes place only when certain load conditions are present. In principle a multiplicity of different construction types of overrun devices are known which can be selected as required.

The first coupling unit can be a first flywheel and the second coupling unit can be a second flywheel. The first flywheel and the second flywheel have different moments of inertia, wherein in particular the moment of inertia of the second flywheel is less than the moment of inertia of the first flywheel. This design takes into account the fact that the rotational irregularities occurring in connection with the operation of the internal combustion engine are usually greater than those occurring on operation of an electric motor. The need for damping of torsional vibrations is therefore greater for the internal combustion engine than for the electric motor, so the corresponding flywheel has a higher mass inertia than that of the electric motor. The lower mass inertia of the second flywheel brings the advantage that less energy must be applied for its acceleration. Finally the construction described thus allows the coupling device to have different moments of inertia depending on the coupling state of the coupling units, so that optimum account is taken of the respective circumstances present.

The electric motor can be coupled for drive purposes with the second coupling unit via a belt drive, a chain drive or a gear connection. The same applies accordingly to the coupling of the internal combustion engine with the first coupling unit.

The first coupling unit and/or the second coupling unit can be connected with the drive shaft via a starter element, in particular a clutch, and/or a rotational vibration damper device. In particular the coupling units form function elements of the rotational vibration damper device. For example depending on operating mode, either individually or in coupled state, they form one of the centrifugal masses of a dual-mass flywheel.

A constructionally simple integration of the coupling device in a conventional drive train can be achieved if the coupling device is arranged between the internal combustion engine and a translation gear of the drive train.

The drive train can comprise a separate starter motor to start the internal combustion engine, so that the internal combustion engine can be started independently of operation of the electric motor.

In particular the starter motor is connected with the internal combustion engine via the first coupling unit. In an embodiment of the first coupling unit as a flywheel, a starter ring gear can be provided thereon which engages with a gear wheel coupled with the starter motor.

The electric motor can be operated as a motor or as a generator. As a result, the functionality of "electrodynamic braking" can also be provided, i.e., in overrun mode of the motor vehicle, that is, when neither the drive pedal nor the brake pedal are activated, a generator mode of the electric motor can be used to generate electrical energy. The internal combustion engine is decoupled in this state as its rotation speed in said situation usually lies below the rotation speed of the drive shaft.

The electric motor can be connected for drive purposes directly or indirectly with ancillary assemblies in order to operate these.

BRIEF DESCRIPTION OF THE DRAWINGS

The invention is now explained below in more detail purely as an example citing advantageous embodiments, with reference to the enclosed drawings. The drawings show.

DETAILED DESCRIPTION OF EMBODIMENTS

Figure 1:
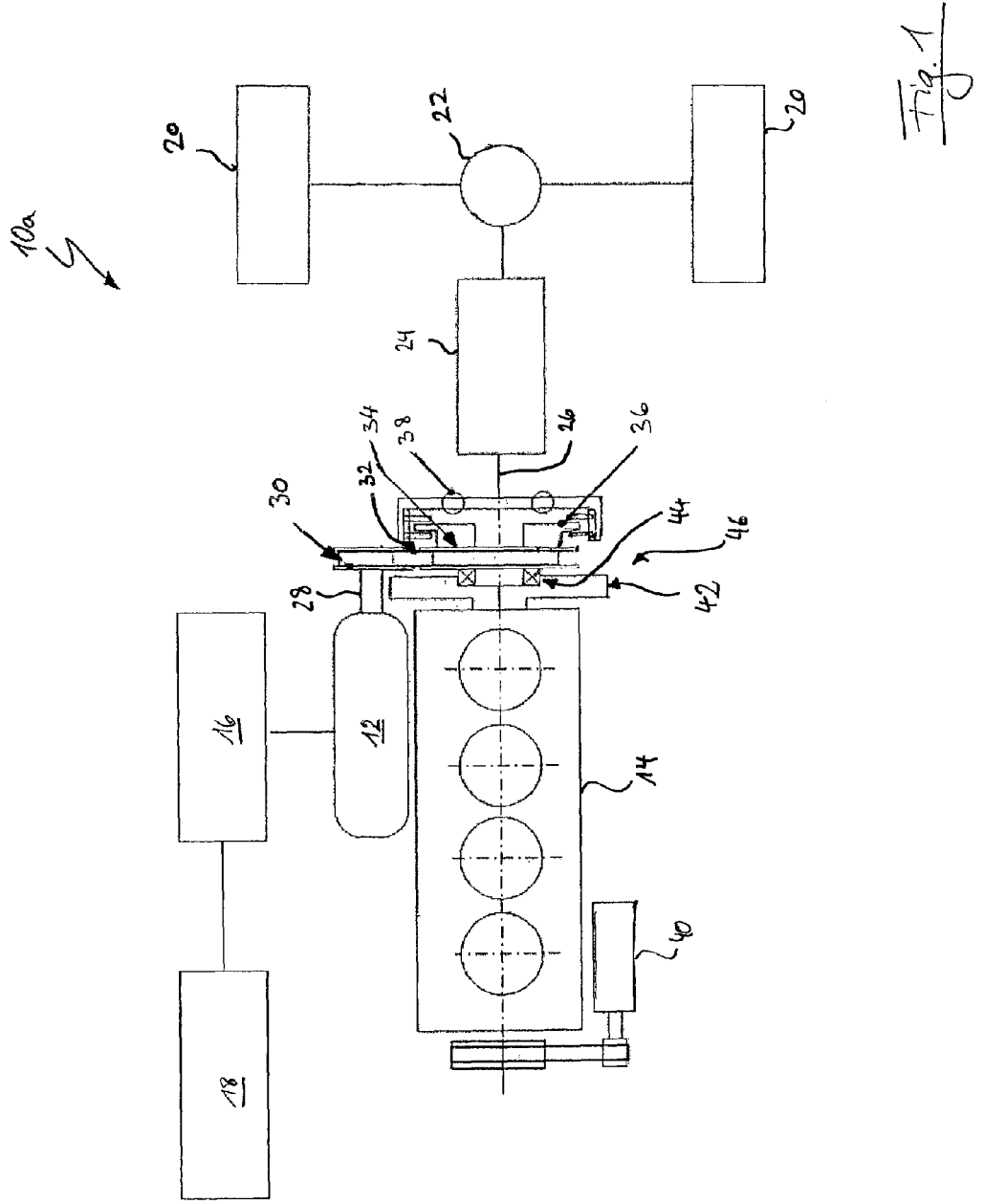
FIGS. 1 to 6 illustrate various embodiments of the drive train in accordance with the invention.

FIG. 1 illustrates a drive train 10a with an electric motor 12 and an internal combustion engine 14. The electric motor 12 is connected via a converter 16 with a battery 18 and, depending on operating state, can charge the battery 18 or extract energy therefrom in order to drive the motor vehicle.

The drive train 10a serves drive wheels 20 of an axle of the motor vehicle. The wheels 20 are connected with a drive shaft 26 via a differential gear 22 and a translation gear 24.

To transfer a drive torque from the electric motor 12 to the drive shaft 26, a belt pulley 30 is provided which is coupled with an output shaft 28 of the electric motor 12 and is also coupled via a belt 32 with a flywheel 34. The flywheel 34 is selectively connected via a starter element 36 with a torsional vibration damper 38 coupled to the drive shaft 26.

When the vehicle starts, the necessary drive moment is provided solely by the electric motor 12 and is transmitted to the flywheel 34 via the shaft 28, the belt pulley 30 and the belt 32. With the starter element 36 closed, the vehicle can be moved in the selected gear stage of the translation gear 24. If now additional drive torque is required at higher speeds, the internal combustion engine 14 is connected. To this end, a starter motor 40 is activated which sets the internal combustion engine 14 running. As the internal combustion engine 14 and the flywheel 34 are not permanently coupled, the internal combustion engine 14 first runs independently of the remaining components of the drive train 10a. Only when the internal combustion engine 14 and a flywheel 42 connected therewith have reached the necessary rotation speed does an overrun device 44 automatically create a coupling between the flywheels 42, 34, and hence, finally a coupling between the internal combustion engine 14 and the drive shaft 26. The overrun device 44 is designed such that a coupling of the flywheels 34, 42 is created only when the internal combustion engine 14 "overtakes" the electric motor 12, i.e., when the rotational speed of the internal combustion engine 14 is at least as great as that of the electric motor 12.

Widely varying types of overrun devices which comprise, for example, clamping bodies, ratchet wheels, toothed discs or wrap springs can be used. Which design is actually used depends, inter alia, on the expected conditions and load requirements on the drive train 10a and the construction space available.

FIG. 1 also illustrates that a conventional drive train can easily be converted into the drive train 10a. It is merely necessary to provide construction space for the motor 12, converter 16 and battery 18, and supplement a conventional starter element-torsion damper combination with a coupling device 46 that includes flywheels 34, 42 and overrun device 44.

A compact construction results when the machines 12, 14 are arranged next to each other so that their rotation axes run in parallel. With this construction, the internal combustion engine 14 and the flywheels 34, 42 and overrun device 44 are arranged coaxially. The coupling device 46 is located, both physically and functionally, between the internal combustion engine 14 and the translation gear 24.

FIG. 1 furthermore illustrates that the flywheel 34 has a smaller radius than the flywheel 42. This indicates that the moment of inertia of the flywheel 42 is greater than that of the flywheel 34 as the rotational irregularities generated by the internal combustion engine 14 are substantially greater than those of the electric motor 12. Conversely, the flywheel 34 can be designed more compactly, which leads to an efficiency rise on purely electric drive of the vehicle, since on acceleration of the motor vehicle only the comparatively low mass inertia of the flywheel 34 must be overcome.

Figure 2:
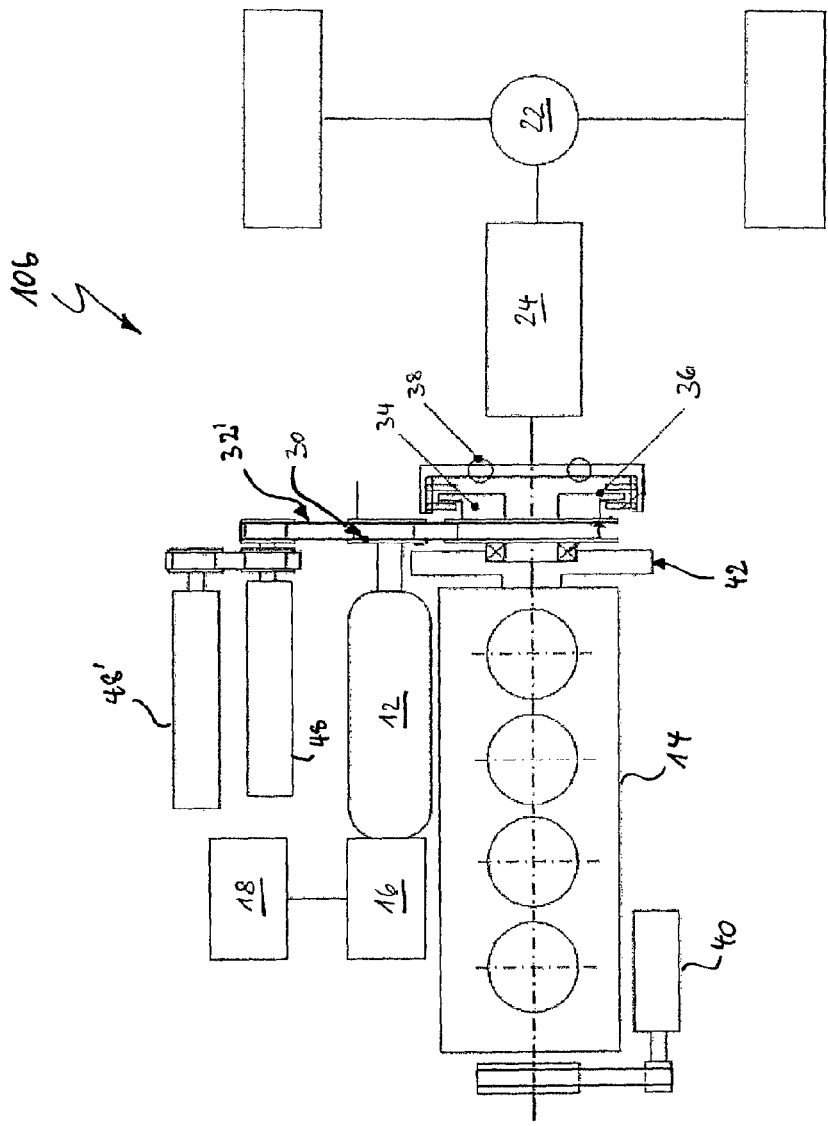

FIG. 2 illustrates a drive train 10*b* which differs from the drive train 10*a* of FIG. 1 in that the electric motor 12 is connected via a second belt 32' with ancillary assemblies 48, 48' in order to supply the ancillary assemblies 48, 48' with drive torque. Evidently, instead of separate belts 32, 32', a single circulating belt can be used which connects the electric motor 12 with both the flywheel 34 and the ancillary assemblies 48, 48'.

Figure 3:
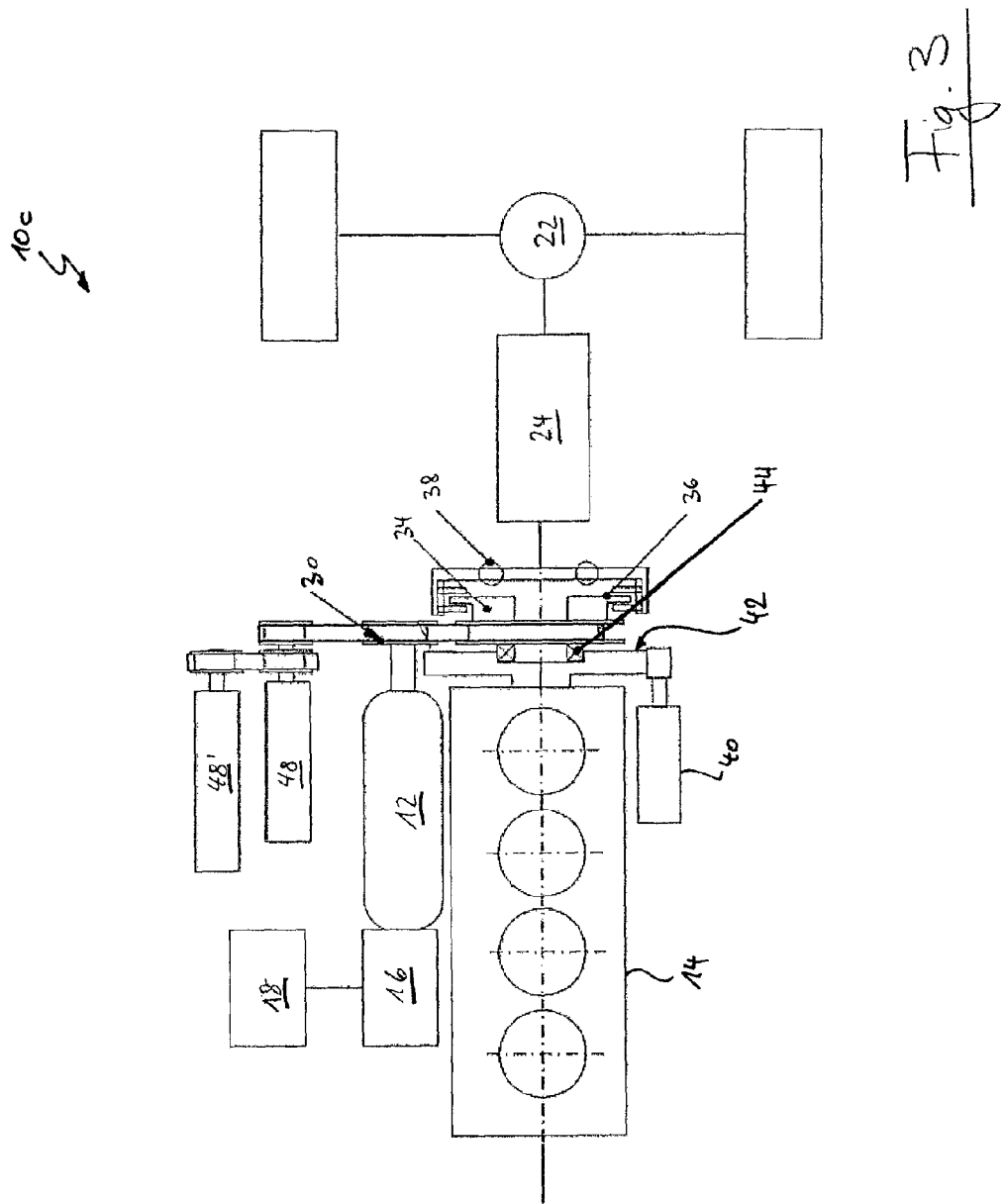

FIG. 3 illustrates a derivation of the drive train 10*b* of FIG. 2, in which the starter motor 40 of the drive train 10*c* is not coupled with the internal combustion engine 42 via a belt drive on its side facing away from the flywheel 42. In the present embodiment, the starter motor 42 co-operates directly with the flywheel 42 in order to start the internal combustion engine 14 when required. To this end, a toothed starter ring gear is provided on the flywheel 42 and engages with a gear wheel which can be driven by the starter motor 40.

Figure 4:
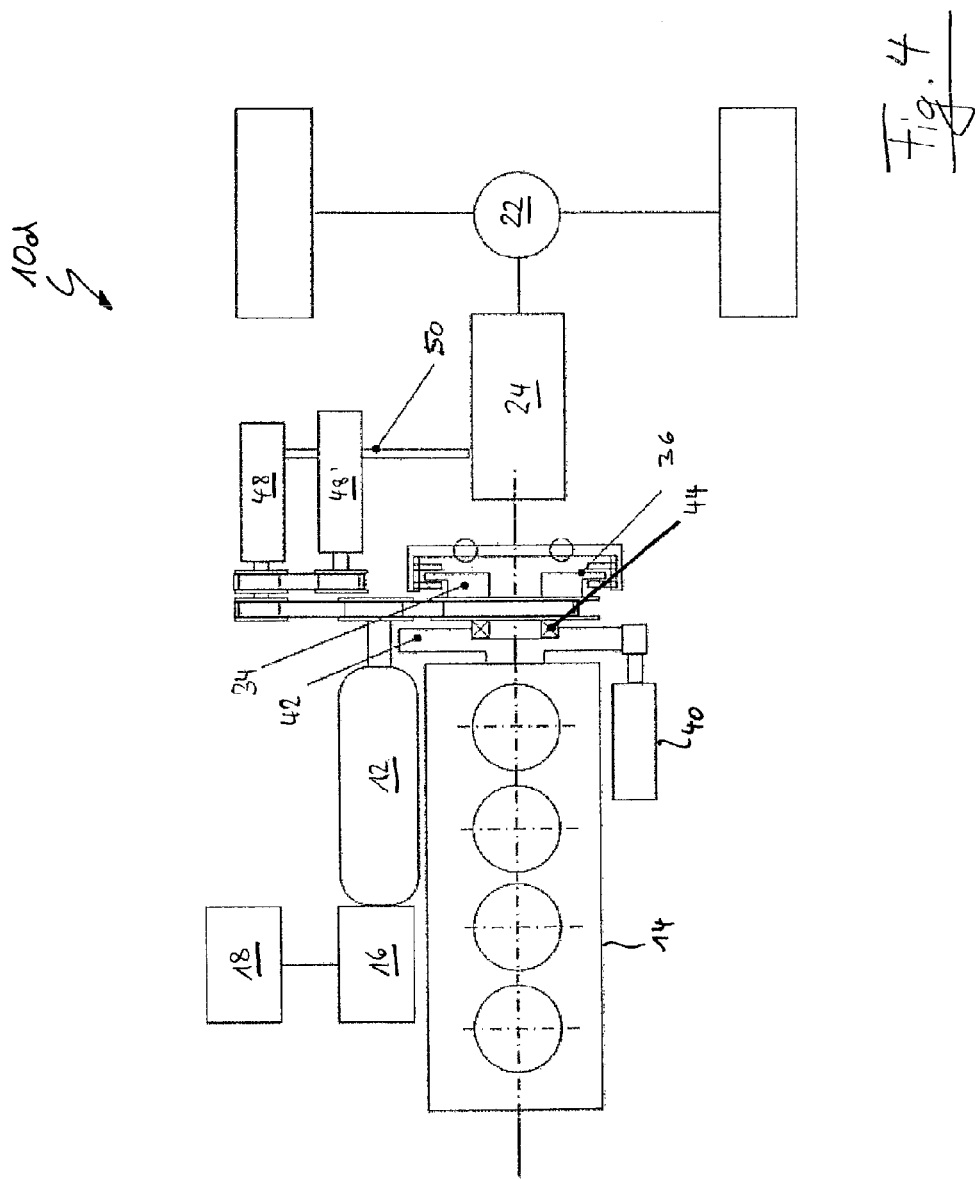

FIG. 4 illustrates a derivation 10*d* of the drive train 10*c* of FIG. 3, in which the ancillary assemblies 48, 48' are coupled not only with the electric motor 12 but also via a connection 50 with the translation gear 24.

Figure 5:
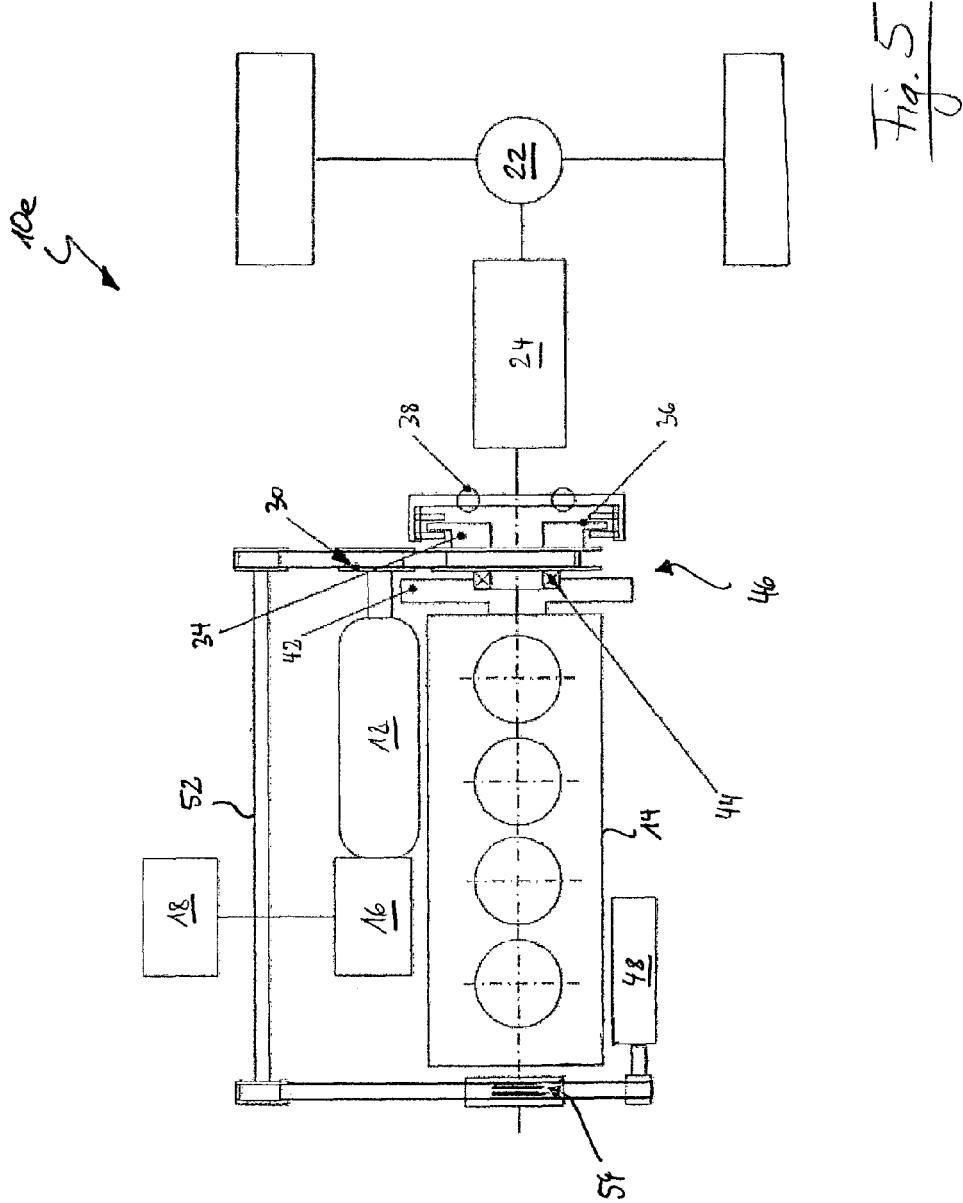

FIG. 5 illustrates a drive train 10*e* which with regard to the design of the coupling device 46 corresponds substantially to the drive trains 10*a*, 10*b*, 10*c* and 10*d*. The electric motor 12, however, is coupled selectively with the ancillary assembly 48 via an auxiliary shaft 52 using a clutch 54. Also the clutch 54 allows starting of the internal combustion engine 14 by the electric motor 12.

Figure 6:
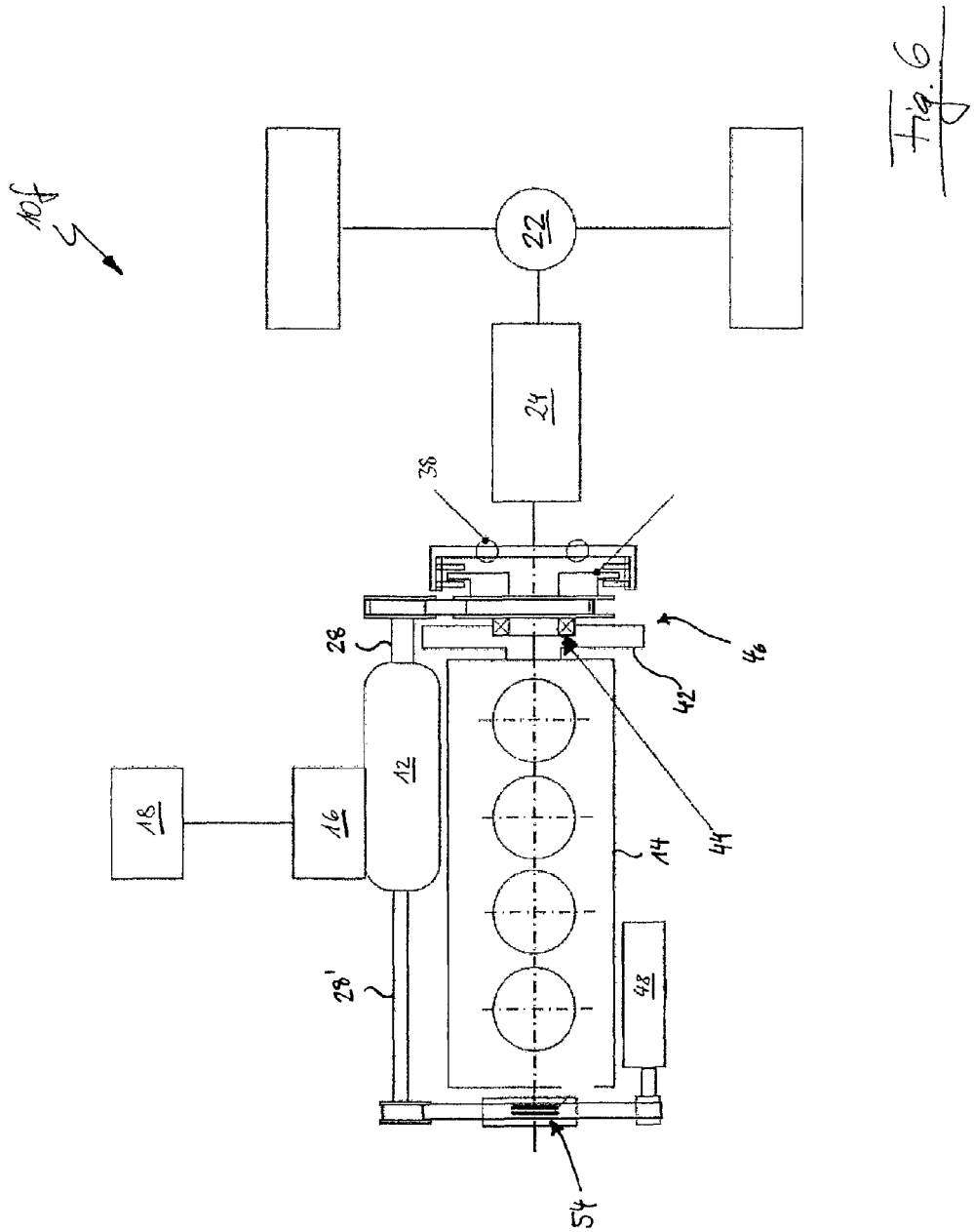

FIG. 6 illustrates an embodiment of a drive train 10*f* which differs from the drive train 10*e* of FIG. 5 in particular in that instead of the auxiliary shaft 52, a second output shaft 28' from the electric motor 12 is provided which serves, via the clutch 54, to start the internal combustion engine 14 or operate the ancillary assembly 48.

A common feature of the respective drain trans 10*a* to 10*f* described hereinabove is that the advantages of an electric motor can easily be combined with the advantages of an internal combustion engine in a drive train without extensive changes to the fundamental construction of a conventional drive train being required. The integration of the electric motor 12 is achieved efficiently by the coupling device 46 which also allows a reliable and efficient integration of the internal combustion engine 14 in the drive train 10*a* to 10*f* as soon as it has reached a suitable rotation speed. This integration takes place automatically via the overrun device 44, minimizing the occurrence of malfunctions.

The drive trains 10*a* to 10*f* also allow purely electric drive of the motor vehicle, whereby the range of the motor vehicle depends on the capacity of the battery 18. Also a start-stop functionality can be provided which is more comfortable and efficient than conventional systems. Also the electric motor 12 can be used directly to provide drive torque for ancillary assemblies 48, 48'. In certain operating states it can also be operated as a generator to charge the battery 18 and supply the ancillary assemblies 48, 48' with electrical energy.

The electric motor 12 can also function as an electrodynamic brake so that the deceleration of the motor vehicle is used to generate electrical energy. In overrun mode, the internal combustion engine 14 rotates more slowly than drive shaft 26 so that the overrun device 44 ensures the decoupling of the flywheels 34, 42. The torque of the drive shaft 26 is thus transmitted only to the electric motor 12 which converts this into electrical energy.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

10*a*, 10*b*, 10*c*, 10*d*, 10*e*, 10*f* Drive train
12 Electric motor
14 Internal combustion engine
16 Converter
18 Battery
20 Wheel
22 Differential gear
24 Translation gear
26 Drive shaft
28, 28' Output shaft
30 Belt pulley
32, 32' Belt
34 Flywheel
36 Starter element
38 Torsional vibration damper
40 Starter motor
42 Flywheel
44 Overrun device
46 Coupling device
48, 48' Ancillary assembly
50 Connection
52 Auxiliary shaft
54 Clutch

What is claimed is:

1. A drive train of a motor vehicle comprising:
   an internal combustion engine;
   an electric motor;
   a coupling device comprising a first coupling unit having a first flywheel operatively connected to the internal combustion engine, and a second coupling unit having a second flywheel operatively connected to the electric motor such that the internal combustion engine and/or the electric motor is connected for drive purposes with a common drive shaft to drive at least one wheel of the motor vehicle; and
   a clutch configured to automatically couple the first coupling unit and the second coupling unit to each other depending on a difference between a rotation speed of the internal combustion engine and rotation speed of the electric motor.

2. The drive train of claim 1, wherein the clutch is configured such that the first coupling unit is coupled for drive purposes with the second coupling unit when the rotation speed of the internal combustion engine is substantially equal to or greater than the rotation speed of the electric motor.

3. The drive train of claim 1, wherein the first coupling unit, the second coupling unit and/or the clutch are arranged coaxially.

4. The drive train of claim 1, wherein the internal combustion engine and/or the electric motor are arranged coaxial to the first coupling unit and the second coupling unit.

5. The drive train of claim 1, wherein the rotation axis of the electric motor is arranged offset to the rotation axis of the internal combustion engine.

6. The drive train of claim 1, wherein the clutch comprises an overrun device.

7. The drive train of claim 1, wherein the first flywheel and the second flywheel have different moments of inertia.

8. The drive train of claim 1, wherein the moment of inertia of the second flywheel is less than the moment of inertia of the first flywheel.

9. The drive train of claim 1, wherein:
the electric motor is coupled for drive purposes with the second coupling unit via the belt drive, a chain drive or a gear connection; and/or
the internal combustion engine is coupled for drive purposes with the first coupling unit via a belt drive, a chain drive or a gear connection.

10. The drive train of claim 1, wherein the first coupling unit or the second coupling unit is connected with the drive shaft via a starter element and/or a rotational vibration damper device.

11. The drive train of claim 1, wherein the coupling device is operatively arranged between the internal combustion engine and a translation gear of the drive train.

12. The drive train of claim 1, further comprising a second motor configured to start the internal combustion engine.

13. The drive train of claim 12, wherein the second motor is coupled with the internal combustion engine via the first coupling unit.

14. The drive train of claim 1, wherein the electric motor is configured for operation as a motor or a generator.

15. The drive train of claim 1, wherein the electric motor is directly connected for drive purposes with ancillary assemblies of the motor vehicle in order to operate the ancillary assemblies.

16. The drive train of claim 1, wherein the electric motor is indirectly connected for drive purposes with ancillary assemblies of the motor vehicles in order to operate the ancillary assemblies.

17. A motor vehicle comprising:
an internal combustion engine;
wheels;
an electric motor;
a coupling device comprising a first coupling unit having a first flywheel operatively connected to the internal combustion engine, and a second coupling unit having a second flywheel operatively connected to the electric motor such that the internal combustion engine and/or the electric motor is connected for drive purposes with a common drive shaft to drive at least one of the wheels; and
a clutch configured to automatically couple the first coupling unit and the second coupling unit to each other depending on a difference between a rotation speed of the internal combustion engine and a rotation speed of the electric motor.

18. A drive train of a motor vehicle comprising:
an internal combustion engine;
a first motor;
a second motor configured to start the internal combustion engine;
a coupling device comprising a first coupling unit having a first flywheel operatively connected to the internal combustion engine, and a second coupling unit having a second flywheel operatively connected to the electric motor such that the internal combustion engine and/or the electric motor is connected for drive purposes with a common drive shaft to drive at least one wheel of the motor vehicle, wherein the second motor is coupled with the internal combustion engine via the first coupling unit; and
a clutch configured to automatically couple the first coupling unit and the second coupling unit to each other depending on a difference between a rotation speed of the internal combustion engine and rotation speed of the electric motor.

19. The drive train of claim 18, wherein the first motor comprises an electric motor.

* * * * *